United States Patent

[11] 3,542,081

[72] Inventor Carl J. Agriesti
 Granville, Ohio
[21] Appl. No. 753,450
[22] Filed Aug. 19, 1968
[45] Patented Nov. 24, 1970
[73] Assignee Owens-Corning Fiberglass Corporation
 a corporation of Delaware

[54] SECTIONAL PIPE INSULATION ASSEMBLY
 9 Claims, 8 Drawing Figs.
[52] U.S. Cl. .................................................. 138/161,
 138/158
[51] Int. Cl. .................................................. F16l 59/12
[50] Field of Search .......................................... 138/141,
 156, 170, 161, 158; 16/184

[56] References Cited
 UNITED STATES PATENTS
2,016,039 10/1935 Hurrell ........................ 138/141

| 2,287,903 | 6/1942 | Rathburn | 16/184X |
| 2,778,759 | 1/1957 | Stephans et al | 138/156 |
| 2,962,402 | 11/1960 | Sweeney | 138/141 |
| 3,244,388 | 4/1966 | Coffman | 138/149 |
| 3,301,727 | 1/1967 | Verrell et al | 138/156X |

FOREIGN PATENTS

| 717,033 | 8/1965 | Canada | 138/161 |
| 760,603 | 6/1953 | Germany | 138/158 |

Primary Examiner—Laverne D. Geiger
Assistant Examiner—R. J. Sher
Attorney—Staelin & Overman ABSTRACT: A sectional pipe insulation assembly. The assembly includes a pair of mating semitubular insulation bodies which are preferably constructed of resin bonded fibrous glass material. The bodies have a first set of edges openable to receive a pipe to be insulated and a second set of edges joined together by hinges. A flexible jacket surrounds the outer surface of the insulation bodies.

Patented Nov. 24, 1970
3,542,081
Sheet 1 of 2
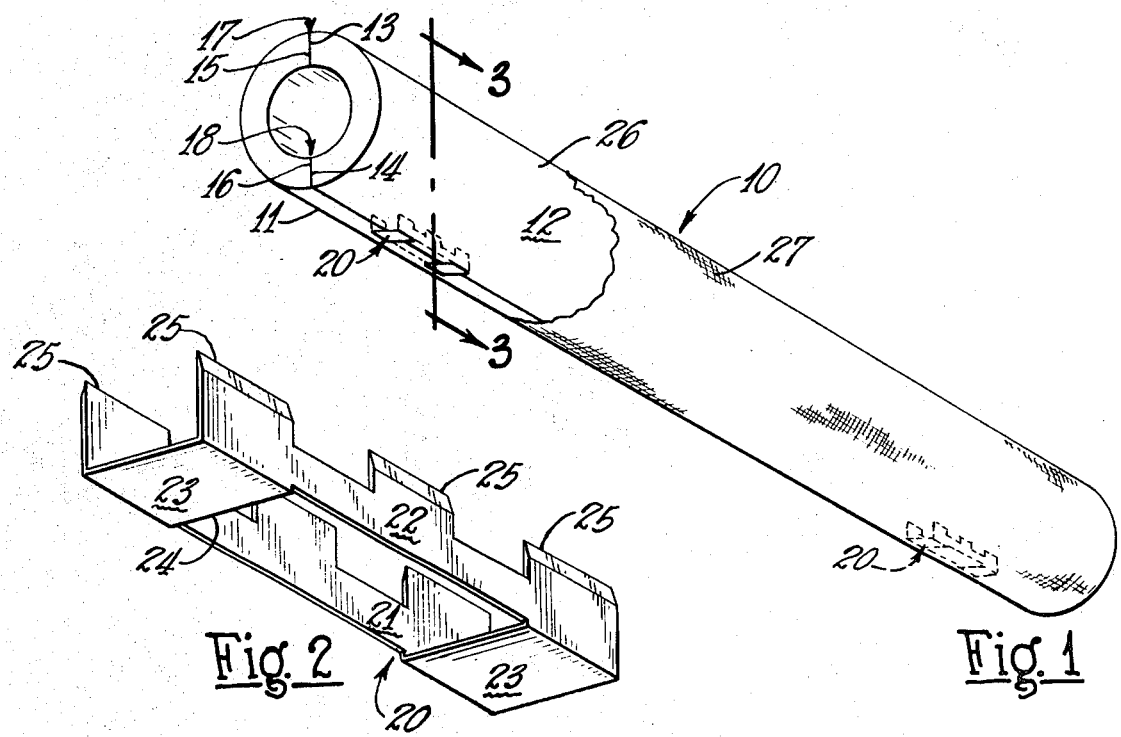
Fig. 1
Fig. 2
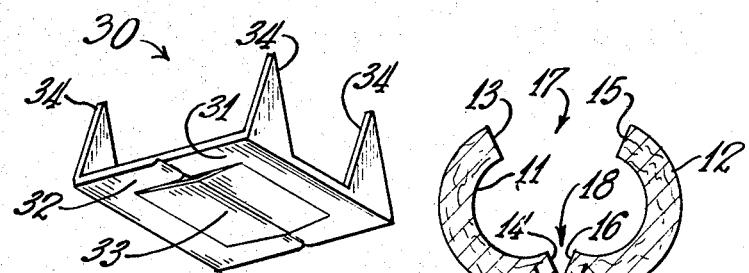
Fig. 4
Fig. 3
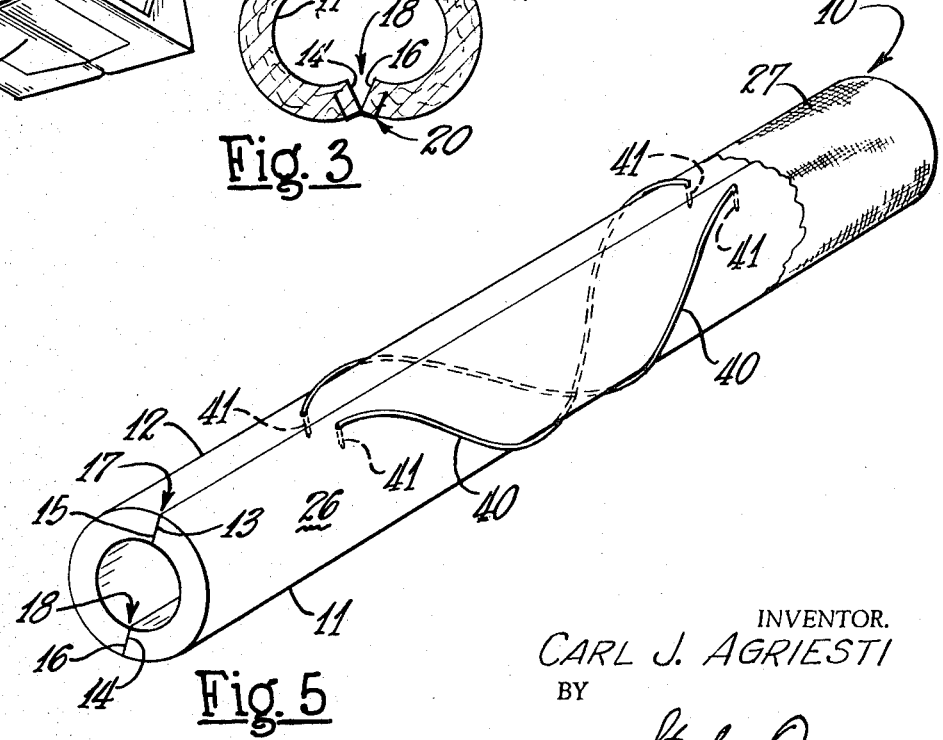
Fig. 5
INVENTOR.
CARL J. AGRIESTI
BY
Staelin + Overman
ATTORNEYS INVENTOR:
CARL J. AGRIESTI.
BY
Stachin & Overman
ATT'YS.

3,542,081

SECTIONAL PIPE INSULATION ASSEMBLY

BACKGROUND OF THE INVENTION

Many attempts have been made in the past to provide sectional pipe insulation which is used to insulate conduits, for examples, hot and cold piping. In addition to good thermal efficiency, sectional pipe insulation must present a pleasing exterior appearance. Because of labor costs, sectional pipe insulation must also be relatively easy and fast to install.

SUMMARY OF THE INVENTION

The present invention is an improved sectional pipe insulation assembly which includes a pair of mating semitubular insulation bodies. The insulation bodies are preferably constructed of resin bonded fibrous glass material. The bodies have a first set of edges which are openable to receive the pipe to be insulated. A second set of edges are joined together by hinges. A flexible jacket surrounds the outer surface of the insulation bodies.

It is the primary object of the present invention to provide an improved sectional pipe insulation assembly.

BRIEF DESCRIPTION OF THE DRAWINGS

FIG. 1 is a perspective view, with parts broken away, of one embodiment of a pipe insulation assembly according to the present invention;

FIG. 2 is a perspective view of a hinge used in the embodiment of the invention shown in FIG. 1; FIG. 3 is a vertical cross-sectional view taken along the line 3-3 of FIG. 1 and showing the pipe insulation assembly in an open position ready to receive a pipe;

FIG. 4 is a perspective view of a hinge used in another embodiment of a pipe insulation assembly according to the present invention;

FIG. 5 is a perspective view, with parts broken away, showing still another embodiment of a pipe insulation assembly according to the present invention;

DESCRIPTION OF THE PREFERRED EMBODIMENTS

Figure 7:
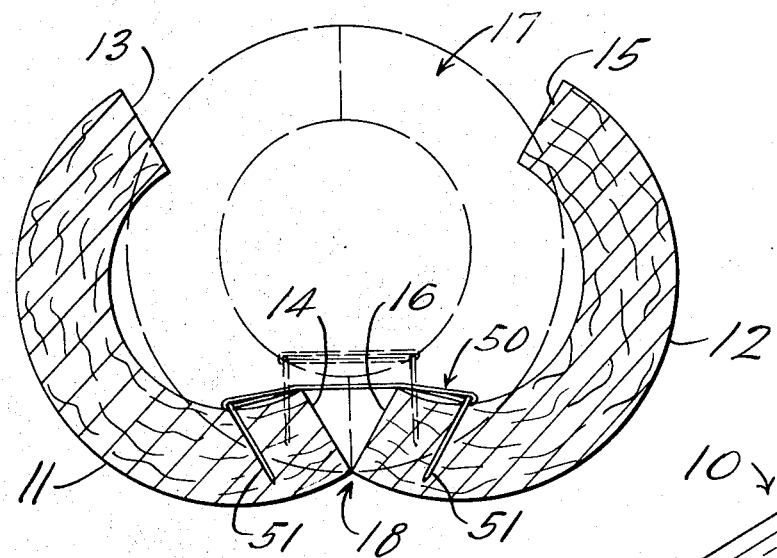
FIG. 7 is a vertical cross-sectional view taken along the line 7-7 of FIG. 6, showing the pipe insulation assembly in an open position and indicating in dashed lines the closed position.

One embodiment of a sectional pipe insulation assembly, according to the present invention, is generally indicated in the drawing by the reference number 10. The pipe insulation assembly 10 includes a pair of mating, semitubular elongated insulation bodies 11 and 12. The insulation bodies 11 and 12 are preferably constructed of resin bonded fibrous glass material having a density of between 6 pounds per cubic foot and 8.5 pounds per cubic foot. The preferred density is between 6.75 pounds per cubic foot and 8.25 pounds per cubic foot. However, insulation materials having densities of between 4.0 pounds per cubic foot and 30.0 pounds per cubic foot can be used for specialized installations. While resin bonded fibrous glass insulation material is preferable, other types of insulation material, for examples rigid foamed plastic or rigid hydrous calcium silicate, can be used.

When in the mating position shown in FIG. 1, the insulation bodies 11 and 12 define two sets of mating longitudinal edges. The insulation body 11 has longitudinally extending edges 13 and 14 while the insulation body 12 has longitudinally extending edges 15 and 16. The longitudinally extending edges 13-15 comprise a first set of edges 17 which are openable (see FIG. 3) to receive a pipe to be insulated. The longitudinally extending edges 14-16 constitute a second set of edges 18.

Hinge means are mounted across the second set of edges 18 for connecting the mating insulation bodies 11 and 12 and for urging the bodies 11 and 12 into the closed position. Referring to FIGS. 1 and 2, in the first embodiment, the hinge means comprises a pair of hinges generally indicated by the reference number 20. The hinge 20 includes a pair of opposing legs 21 and 22. An integral central portion 23 extends between the opposed legs 21 and 22 and has a hinge tension opening 24. The opening 24 is of a predetermined size which is chosen to place the proper degree of hinge tension upon the mating insulation bodies 11 and 12. To change the hinge tension the area of the opening 24 is varied. The hinge 20 also includes a plurality of projections 25 which extend outwardly from the opposed legs 21 and 22. As shown in FIG. 1, the hinge 20 is connected to the insulation bodies 11 and 12 across the second set of longitudinally extending edges 18.

During the installation of the sectional pipe insulation assembly 10, the first set of edges 17 are opened, as shown in FIG. 3, and positioned around the pipe. The snap action of the hinges 20 urge the assembly 10 back to the positions shown in FIG. 1. An outer surface 26 of the insulation bodies 11 and 12 is surrounded with a flexible jacket 27 which is at least partly adhered to the insulation bodies 11 and 12. As shown at the right-hand side of FIG. 1, the jacket 27 covers the hinges 20 so that the pipe insulation assembly 10 has a pleasing exterior appearance.

Referring to FIG. 4, in another embodiment of the present invention, a hinge 30 is substituted for the hinge 20 shown in FIG. 1. The hinge 30 is constructed according to the disclosure in U.S. Pat. No. 3,289,877 and includes opposing legs 31 and 32 which are connected to the respective insulation bodies 11 and 12 across the second set of longitudinally extending edges 18. A central overcenter portion 33 interconnects the legs 31 and 32 and urges the legs 31 and 32 into their extreme positions. In one extreme position the legs 31 and 32 lie in a single plane as shown in FIG. 3 and in the other extreme position the hinge 30 is closed and the legs 31 and 32 are closely adjacent one another (not shown). The hinge 30 includes a plurality of outwardly extending projections 34 which are used in connecting the hinge 30 to the insulation bodies 11 and 12. However, the present invention is not restricted to the use of the projections 34. Other types of connecting means, for examples, staples or plastic connecters, can be utilized.

Still another embodiment of the present invention is shown in FIG. 5. In this embodiment, a pair of serpentine hinges 40 are substituted for the hinges 20 of the FIG. 1 embodiment. The serpentine hinges 40 are preferably constructed of a spring steel wire. The serpentine hinge 40 includes inwardly extending members or prongs 41 at its opposed ends. Each of the serpentine hinges 40 extends from a point adjacent the first set of longitudinally extending edges 17, around the cylindrical outer surface 26, across the second set of longitudinally extending edges 18 to a point adjacent the first set of edges 17 located on the opposed one of the insulation bodies 11—12.

Figure 6:
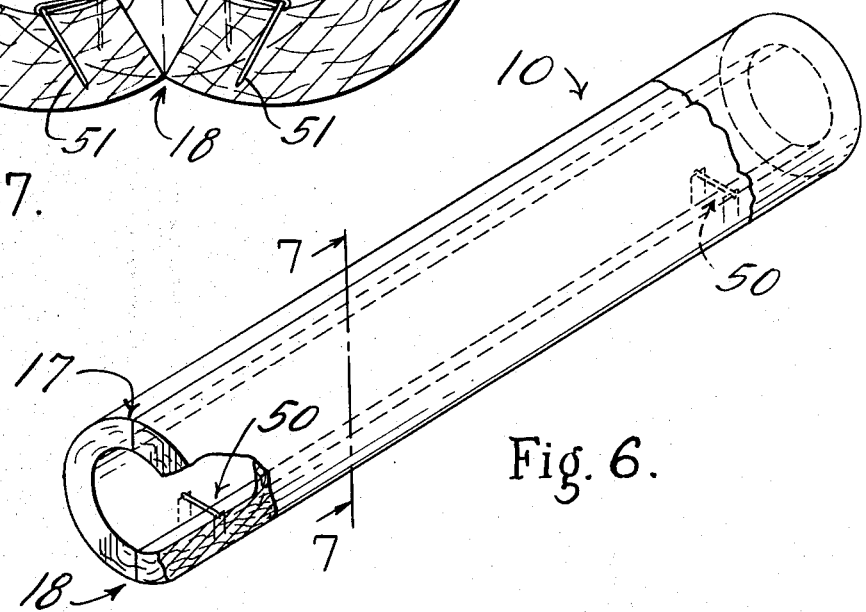
FIG. 6 is a perspective view, with parts broken away, showing another embodiment of a pipe insulation assembly according to the present invention.
Figure 8:
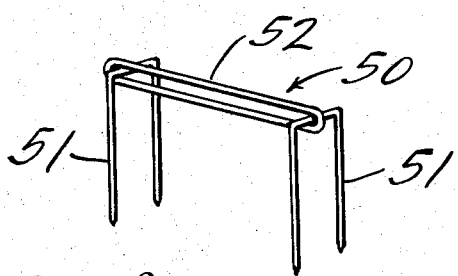
FIG. 8 is a perspective view of a hinge used in the embodiment of the invention shown in FIGS. 6 and 7.

Another embodiment of the present invention is shown in FIGS. 6—8. In this embodiment a pair of resilient hinges 50 are substituted for the hinges 20 of the FIG. 1 embodiment. Each hinge 50 includes a pair of U-shaped anchors 51 and a resilient member 52. The resilient member 52 may be a high temperature elastic band or, for example, a tension spring (not shown). One of the U-shaped anchors 51 is inserted in the insulation body 11 and the other U-shaped anchor 51 is inserted in the insulation body 12. The anchors 51 are mounted adjacent the second set of edges 18. The resilient member 52 is connected to the pair of anchors 51 and extends across the second set of edges 18. The resilient member 52 of each hinge 50 urges the assembly 10 into the closed position shown in FIG. 7.

While the present invention has been disclosed in connection with a specific arrangement of parts and with respect to a preferred embodiment, it should be expressly understood that numerous modifications and changes may be made without departing from the scope of the appended claims.

I claim:

1. A sectional pipe insulation assembly comprising, in combination, a pair of mating semitubular elongated insulation bodies having a cylindrical outer surface, said insulation bodies having first and second sets of longitudinally extending edges, said first set of edges being openable to receive a conduit to be insulated, resilient hinge means mounted across said second set of edges for connecting said pair of insulating bodies and for urging said bodies into a mating position, whereby said resilient hinge means is effective to maintain said first set of edges in a snug engaging relationship, each of said hinge means including first and second leg means, said first leg means at least partially inserted in one of said insulation bodies and said second leg means at least partially inserted in the other one of said insulation bodies, and a flexible jacket surrounding said cylindrical outer surface of said insulation bodies.

2. A sectional pipe insulation assembly comprising, in combination, a pair of mating semitubular elongated insulation bodies having a cylindrical outer surface, each of said bodies being constructed of resin bonded fibrous glass material, said insulation bodies having first and second sets of longitudinally extending edges, said first set of edges being openable to receive a conduit to be insulated, resilient hinge means mounted across said second set of edges for connecting said pair of insulating bodies and for urging said bodies into a mating position, whereby said resilient hinge means is effective to maintain said first set of edges in a snug engaging relationship, each of said hinge means including first and second leg means, said first leg means at least partially inserted in one of said insulation bodies and said second leg means at least partially inserted in the other one of said insulation bodies, and a flexible jacket surrounding said cylindrical outer surface of said insulation bodies.

3. A sectional pipe insulation assembly, according to claim 2, wherein said insulation bodies have a density of between 6 pounds per cubic foot and 8.5 pounds per cubic foot.

4. A sectional pipe insulation assembly, according to claim 2, wherein said hinge means includes at least two hinges.

5. A sectional pipe insulation assembly, according to claim 4, wherein each of said hinges has a central portion positioned between said first and second leg means, said central portion defining a hinge tension opening.

6. A sectional pipe insulation assembly, according to claim 5, wherein each of said leg means has a plurality of outwardly extending projections.

7. A sectional pipe insulation assembly, according to claim 2, wherein said hinge means includes at least two hinges, each of said hinges including overcenter means integral with said first and second leg means for urging said leg means towards their extreme positions.

8. A sectional pipe insulation assembly, according to claim 2, wherein said hinge means includes a pair of resilient hinges, each of said first and second leg means of each of said resilient hinges comprising a pair of U-shaped anchors and a resilient member extending between said anchors.

9. A sectional pipe insulation assembly comprising, in combination, a pair of mating semitubular elongated insulation bodies having a cylindrical outer surface, each of said bodies being constructed of resin bonded fibrous glass material, said insulation bodies having first and second sets of longitudinally extending edges, said first set of edges being openable to receive a conduit to be insulated, hinge means mounted across said second set of edges for connecting said pair of insulating bodies and for urging said bodies into a mating position, said hinge means including a pair of serpentine hinges, each of said serpentine hinges having inwardly extending members at its opposed ends, each of said serpentine hinges extending from a point on one of said insulation bodies adjacent said first set of edges, around a portion of said cylindrical outer surface, across said second set of edges and to a point on the other of said insulation bodies adjacent said first set of edges, and a flexible jacket surrounding said cylindrical outer surface of said insulation bodies.